United States Patent Office 2,906,763
Patented Sept. 29, 1959

2,906,763

PREPARATION OF CYCLOALKYL ALUMINUM COMPOUNDS

Art C. McKinnis, Long Beach, Calif., assignor to Union Oil Company of California, Los Angeles, Calif., a corporation of California No Drawing. Application October 7, 1957
Serial No. 688,401

7 Claims. (Cl. 260—448)

This invention relates to the preparation of cycloalkyl aluminum compounds by olefin-exchange methods. More specifically it concerns novel methods for catalyzing the displacement of isoolefins from isoalkyl aluminum compounds with cycloolefins. It has been discovered that this general reaction is markedly accelerated by catalysts from the class consisting of activated alumina, silica gel, and mixtures thereof.

It is therefore the principal object of this invention to provide catalysts which will accelerate the displacement of isoolefins from isoalkyl aluminum compounds with cycloolefins. Other objects will appear from the description which follows.

Secondary alkyl aluminum compounds are difficult to prepare, and when formed are prone to rearrange into primary alkyl aluminum compounds. For example, when triisobutyl aluminum is heated with octene-3, the product is mainly tri-n-octyl aluminum. The secondary alkyl aluminum compounds display unique effects when used as catalysts for the polymerization of olefins. They are also useful intermediates in chemical syntheses. It would therefore be highly desirable to provide a cheap, convenient method for preparing stable secondary alkyl aluminum compounds.

The cycloolefins provide a stable class of secondary alkyl radicals. When a cycloolefin is reacted with an isoalkyl aluminum, a shift in the position of the double bond of the cycloolefin can only result in another secondary alkyl radical. Hence, the aluminum atom must bond to a secondary carbon atom.

It is known that when cyclohexene is refluxed with triisobutyl aluminum, there is very slow displacement of isobutene, and cyclohexyl diisobutyl aluminum is eventually formed. I have now found that activated alumina, silica, or mixtures thereof will greatly accelerate this reaction, and moreover will catalyze a further displacement of isobutyl groups, the ultimate product being a dicyclohexyl alkyl aluminum, and/or tricyclohexyl aluminum.

The general reaction may be represented as follows:

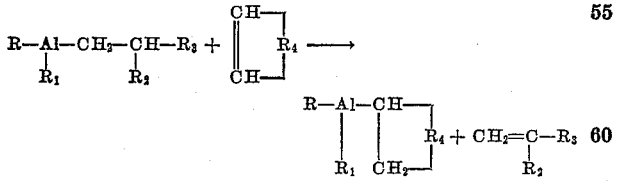

wherein R and $R_1$ may either be displaceable isoalkyl radicals, or non-displaceable hydrocarbon radicals, $R_2$ and $R_3$ are alkyl radicals, and $R_4$ is an unbranched alkylene radical.

It will be noted that the isoalkyl aluminum compound contains at least one aluminum-bonded alkyl radical which is branched at the beta carbon atom. The beta carbon atom must be bonded to only one hydrogen atom. Only alkyl radicals of this character are readily displaceable by cycloolefins, and the term "isoalkyl" is used herein to designate such radicals. Suitable isoalkyl aluminum compounds include for example:

Triisobutyl aluminum
Diisobutyl ethyl aluminum
Isobutyl diethyl aluminum
Diisobutyl n-dodecyl aluminum
Diisobutyl n-octadecyl aluminum
Diisobutyl benzyl aluminum
Tri(2-methyl-n-butyl) aluminum
Di(2-methyl-n-butyl) n-propyl aluminum
Di(2,3-dimethyl-n-butyl) ethyl aluminum
Di(2,3-dimethyl-n-butyl) phenyl aluminum
Di(2-methyl-n-dodecyl) ethyl aluminum In general, the isoalkyl groups may each contain from 4 to about 20 carbon atoms, and any non-displaceable hydrocarbon groups may contain from 2 to about 40 or more carbon atoms.

Suitable cycloolefins include for example cyclopentene, cyclohexene, cycloheptene, cyclooctene, cyclononene, cyclodecene, etc. In general any cycloolefin free of side-chains, and containing between 4 and 20 carbon atoms may be used. The 5–8 carbon atom members are preferred.

The reaction may be carried out either continuously or batch-wise by simply heating the isoalkyl aluminum compound with the cycloolefin in the presence of the catalyst. Preferably the isoolefin formed is continuously removed. This is easily accomplished by employing a cycloolefin which has a higher boiling point than the isoolefin which is formed, and simply refluxing the mixture while continuously taking off isoolefin overhead. A continuous process may be carried out by contacting gaseous cycloolefin countercurrently with the aluminum compound. In this case the cycloolefin may boil either above or below the boiling point of the isoolefin, the reaction mixture being kept at a temperature above the boiling point of each. Operative temperatures range between about 20° and 300° C., preferably about 50°–150° C. The time required for completion depends upon the particular reactants and temperature, but complete mono-displacement may usually be obtained in about 0.5 to 3 hours, and the di-displacement in 1 hour to 5 days.

The catalysts employed herein are per se well known in the art. Alumina is preferably used in the form of an activated gel of gamma alumina, i.e. the xerogel. Silica is preferably used in the form of silica xerogel. The xerogels of silica or alumina are conveniently prepared by precipitating the respective hydrogels (hydrous oxide) from an aqueous solution of sodium silicate or an aluminum salt, then drying and calcining the gel at 400°–1000° C. for 1 to 5 hours. Mixed gels may be prepared by coprecipitation with $CO_2$ from aqueous sodium silicate-sodium aluminate solutions.

In addition to the synthetic gels, other activated forms of $Al_2O_3$ and/or $SiO_2$ may also be used, as for example bauxite, or acid-washed clays of the montmorillonite type, e.g. bentonite.

The following examples are cited to illustrate the process but are not intended to be limiting in scope.

*Example I*

About 500 ml. of cyclohexene and 100 ml. of triisobutyl aluminum were placed in a flask and refluxed in the absence of catalyst under a condenser at atmospheric pressure. The temperature was about 82–90° C. and isobutene was continuously taken overhead through a calcium chloride tube and collected. During 18 hours of continuous refluxing, isobutene was generated at a substantially constant rate of only 0.005 cubic feet per hour, indicating a very slow reaction.

After the 18-hour period, 3 pellets (⅜″ diameter) of synthetic, coprecipitated silica-alumina gel (85% $SiO_2$-15% $Al_2O_3$) were added to the flask. Thereafter, for the next 1½ hours, isobutene was generated at the rate of 0.014 cubic feet per hour, showing an almost threefold increase in reaction rate.

At the end of the 1½ hour period, 25 more pellets of the silica-alumina catalyst were added. Isobutene was then generated at the rate of 0.02 cubic feet per hour for 40 minutes. The rate of reaction is hence clearly proportional to the amount of catalyst present.

The ultimate product was mainly cyclohexyl diisobutyl aluminum.

Example II

In another experiment, 500 ml. of cyclohexene and 100 ml. of triisobutyl aluminum were refluxed at 85–90° C. in the presence of about 25 pellets of the silica-alumina catalyst of Example I. Isobutene was continuously evolved and collected. After 5 days the reaction was stopped and the excess cyclohexene distilled off. A slushy white product remained, a portion of which gave upon hydrolysis with water, 3.3 moles of cyclohexane ($n_D$=1.4220) per mole of isobutane. The product was hence about 75% dicyclohexyl isobutyl aluminum and 25% tricyclohexyl aluminum.

When the foregoing experiment is repeated in the absence of catalyst, the resulting product gives upon hydrolysis substantially more isobutane than cyclohexane, thus showing that the production of poly-cyclohexyl aluminum compounds is not feasible in the absence of catalyst.

When either of the foregoing examples is repeated using pure silica gel or pure alumina gel as catalysts, the results are substantially the same. It will hence be apparent that the catalysts of this invention are highly useful for accelerating the displacement of isoalkyl radicals with cyclohexyl radicals. It is not intended that the foregoing description should be limiting in scope except where indicated. The true scope of the invention is intended to be embraced by the following claims.

I claim:

1. A method for preparing a cycloalkyl aluminum compound which comprises reacting an isoalkyl aluminum compound with a cycloalkene in the presence of a catalyst selected from the class consisting of activated alumina, silica gel and mixtures thereof, said isoalkyl aluminum compound having the formula:

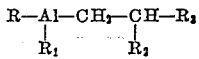

wherein R and $R_1$ are hydrocarbon radicals, and $R_2$ and $R_3$ are alkyl radicals.

2. A process as defined in claim 1 wherein said isoalkyl aluminum compound is a triisoalkyl aluminum.

3. A process for preparing a cyclohexyl aluminum alkyl which comprises reacting a triisoalkyl aluminum with cyclohexene in the presence of a catalyst selected from the class consisting of activated alumina, silica gel and mixtures thereof, each isoalkyl radical in said triisoalkyl aluminum having the configuration:

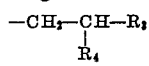

wherein $R_3$ and $R_4$ are alkyl radicals.

4. A process as defined in claim 3 wherein said catalyst is a coprecipitated mixture of silica gel and alumina gel.

5. A method for preparing a cyclohexyl aluminum compound which comprises refluxing cyclohexene with a triisoalkyl aluminum wherein the olefin corresponding to said isoalkyl radicals boils at a temperature lower than cyclohexene, and continuously removing the displaced olefin, said refluxing being carried out in the presence of a catalyst selected from the class consisting of activated alumina, silica gel, and mixtures thereof, each isoalkyl radical in said tri-isoalkyl aluminum having the configuration:

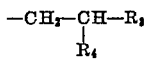

wherein $R_3$ and $R_4$ are alkyl radicals.

6. A process as defined in claim 5 wherein said triisoalkyl aluminum is triisobutyl aluminum.

7. A process as defined in claim 5 wherein said catalyst is a mixture of coprecipitated alumina gel and silica gel.

No references cited.